Oct. 19, 1926.
A. R. SMITH
1,603,878
ELIMINATOR
Filed May 19, 1924
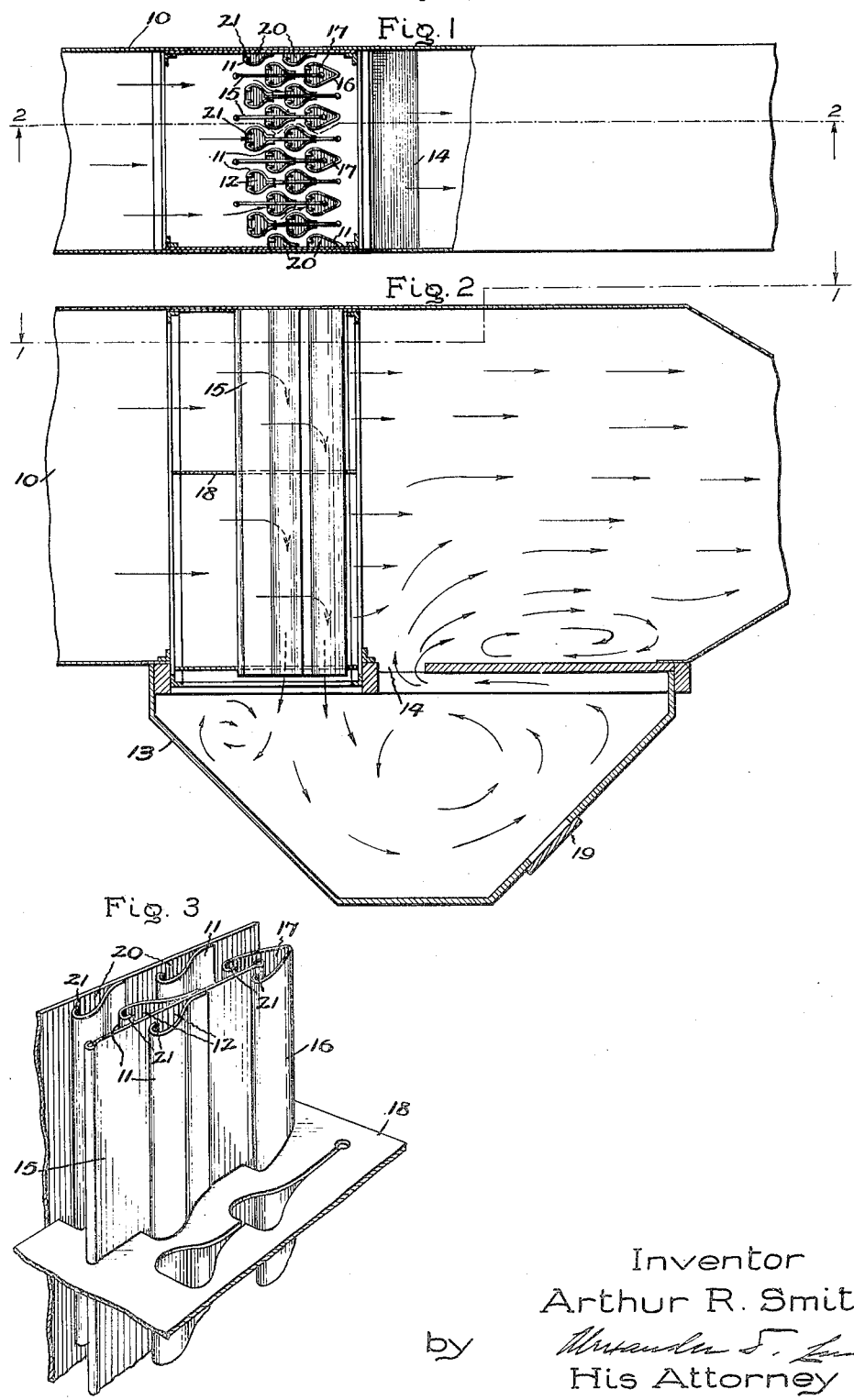
Inventor
Arthur R. Smith
by
His Attorney Patented Oct. 19, 1926.

1,603,878

UNITED STATES PATENT OFFICE.

ARTHUR R. SMITH, OF SCHENECTADY, NEW YORK, ASSIGNOR TO GENERAL ELECTRIC COMPANY, A CORPORATION OF NEW YORK.

ELIMINATOR.

Application filed May 19, 1924. Serial No. 714,186.

My invention relates to eliminators for separating elements having relatively different physical properties with respect to weight and mass, such as water from steam, or solid material from air or other gases.

The object of my invention is to provide a practical and efficient eliminator of simple construction for separating elements of the above character when moving at a high velocity without materially interfering with the quantity or velocity of the gas passing therethrough.

Heretofore, as far as I am aware, eliminators of the type contemplated by my invention have been provided with baffles, or the like, which intercept the heavier elements or foreign matter as it passes through the eliminator and then permit it to drop, by reason of its weight and the force of gravity, into a receptacle which is provided for that purpose. Such eliminators operate quite satisfactorily where the velocity of the elements is relatively low and the quantity passing therethrough is small, but where the velocity of the elements is high and the quantity large, eddying will occur between the baffles of the eliminator and a back pressure or vapor buffer will be established between the baffles, and for these reasons such eliminators are not as satisfactory for high velocity work as an eliminator built in accordance with my invention.

In an eliminator made in accordance with my invention, I provide sinuous passageways for the major portion of the gas having pockets arranged therein for catching the heavier of the elements together with a portion of said gas and also provide for a circulation of the elements so caught within the pockets, which will act to clear the pockets rapidly and carry these elements downwardly within the pockets toward a suitable receptacle, where the heavier elements or foreign matter is deposited and remains, the gas so caught being allowed to pass through the receptacle and back into the main conduit beyond the eliminator.

The various features of novelty which characterize my invention are pointed out with particularity in the claims annexed to and forming a part of this specification. For a better understanding of my invention, reference may be had to the following description, taken in connection with the accompanying drawings, in which Fig. 1 is a plan view of a conduit or flue having an eliminator built in accordance with my invention and is a view taken along line 1—1 of Fig. 2, Fig. 2 is a side elevation taken along lines 2—2 of Fig. 1, and Fig. 3 is a fragmentary, perspective view showing the arrangement of the eliminator elements.

While my invention has many applications, I have chosen in the present instance to illustrate and described it as embodied in a steam generating plant for arresting and separating cinders and other foreign matter from the flue gases in their travel from the furnace to the smoke stack.

In the drawing, I have shown an eliminator built in accordance with my invention embodied in a conduit or flue 10 which connects the furnace of a power plant with the stack. The eliminator in this embodiment is provided with a plurality of pocket forming members 11 which are shown as semi-tubular in shape and form pockets 12. These semi-tubular members 11 extend from the top to the bottom of the conduit 10 and are arranged in staggered relation to each other so as to provide sinuous passageways through the eliminator. As the flue gas laden with cinders and other foreign matter change direction in passing through the sinous passageways in the eliminator, the heavier particles or elements are thrown outwardly by reason of their greater inertia into the pockets 12 and the greater part of the flue gas passes on through the eliminator free of cinders, or other foreign matter. The pockets 12 are open toward the approaching gas and are adapted to discharge the incoming cinders and other foreign matter downwardly and out through openings at their bottom end and which communicate with said conduit beyond said sinuous passageways.

For the purpose of catching the foreign matter which is discharged by the pockets 12, I provide a hopper 13 which is located below the pockets 12 and is provided with an opening 14, which may be restricted in size and which communicates directly with the conduit 10 immediately beyond and adjacent the eliminator. As the gas and foreign matter pass through the eliminator a small portion of the flue gas will also be caught in the pockets 12 with the foreign matter. This small portion of flue gas together with the foreign matter caught by the pockets 12 is then discharged into the hopper 13 where the cinders and other foreign matters settles. This gas, as previously stated, then passes on through the hopper 13 and over the settling cinders and other foreign matter and returns again to the conduit 10 directly upward through the outlet opening 14, free of any foreign matter.

The semi-tubular members 11 are mounted within the eliminator upon partitions 15 which are arranged vertically and in a plane parallel to the direction of flow of the gas. These partitions, in addition to supporting the members 11, also serve to divide the conduit 10 into a plurality of narrow passageways and thus separate the flowing gas into a number of narrow slices. This feature together with the pockets 12, arranged as shown, reduces the distance, which the foreign matter must be projected through or transverse the normal flow of gas, and this minimizes the danger of the foreign matter being carried through the eliminator with the gas. The partitions 15 are staggered and the semi-tubular members 11 are mounted in pairs by riveting or welding one of each pair on each side of said partitions. The alternate partitions 15 support two pairs of pocket forming tubular members 11 and the other partitions support one pair of tubular members 11. A trough shaped member 16 is provided at the trailing ends of the latter partitions which also form pockets 17. In addition to the pockets formed on the partitions 15, I provide pockets 20 which are formed on the sides of the eliminator by other semi-tubular members 11 which are arranged singly thereon. The pockets thus formed within the eliminator are arranged as previously stated in staggered relation with respect to each other on adjacent partitions 15 and the semi-tubular members 11 cooperating with the partition 15 provide definite and distorted or sinuous passageways through the eliminator. The semi-tubular members 11 are provided with lips 21 which project into the pockets in such manner that no foreign matter can escape therefrom after once having been trapped.

In order to more firmly secure the pocket forming members 11 in position, I provide horizontal partitions 18 which surround the vertical partitions 15 and the pocket forming members 11 and 16. These horizontal partitions 18 do not extend into the pockets 12, 17 or 20, but are cut away so as to provide an opening through which the foreign matter can be discharged downwardly from the pockets. In the drawing I have shown one such partition 18 midway between the upper and lower ends of the pockets and one at the bottom ends thereof; however, any number of such partitions can be provided depending upon the height of the eliminator. The bottom partition 18 forms the bottom of the eliminator and causes the flue gas, with the exception of that which is discharged downwardly within the pockets 12, 17 and 20, to pass through the eliminator in a horizontal direction.

The outlet opening 14 of the hopper 13 is located immediately beyond the eliminator as in this position, it has been found to give the best results. The size of the opening 14 can be varied to take care of different operating conditions. The size of the opening under a particular set of circumstances should be such that the gases passing through the hopper 13 will have a greatly reduced velocity, as compared with the velocity of the gas passing through the main conduit 10. I have found that an outlet opening 14 having an area of three and three quarters times as large as the combined area of the discharge openings from the pockets 12, 17 and 20 will give the best average results. The bottom of the hopper 13 can be provided with any suitable means to remove the accumulated cinders and other foreign matter. In the drawing I have shown a door 19 through which the above mentioned accumulation can be removed.

As a result of the above arrangement, the gas together with the entrapped foreign matter which is caught in the pockets 12, 17 and 20 circulates downwardly and out of the pockets into the hopper 13 at a relatively high velocity depending upon the velocity of the gas in the conduit 10 and thus acts to clear the pockets of foreign matter faster than would be the case if no circulation were provided through the pockets 12, 17 and 20 and hopper 13. It is at this point, that the the size of the opening 14 plays a prominent part in the successful operation of my invention. The opening should be of such size that the velocity of the gas discharged into the hopper will be reduced to a point where the foreign matter will settle out of the flowing gas without any danger of carrying along or picking up the deposited foreign matter from the hopper and carrying it back into the conduit 10. Another feature of this arrangement is that eddying within the pockets is reduced to a minimum and the formation of a vapor buffer in the pockets due to a back pressure which would tend to prevent foreign matter entering is impossible and as a result an eliminator is produced which will operate very efficiently when used to separate foreign matter from gas flowing at a relatively high velocity.

While I have shown only four rows of pockets in the above described embodiment, it should be understood that any number of rows of pockets may be provided depending upon the conditions existing at the place of installation.

What I claim as new and desire to secure by Letters Patent of the United States, is:—

1. In an eliminator, the combination of a conduit for a flowing gas, a plurality of members within said conduit forming pockets adapted to entrap the foreign matter contained in said gas, means adjacent the ends of said pockets for receiving the foreign matter discharged thereby, said means communicating directly with said conduit immediately beyond and adjacent said pockets for permitting a circulation of a portion of said gas through said pockets and directly upward into said conduit.

2. In an eliminator, the combination of a conduit for a flowing gas, a plurality of members within said conduit forming pockets adapted to entrap the foregn matter contained in said gas and discharge it out of said conduit, said pockets being open at their lower ends and extending through said conduit, and means adjacent said conduit for receiving the foreign matter discharged from said pockets and having an outlet communicating directly with said conduit immediately beyond and adjacent said pockets for permitting the circulation of a portion of said flowing gas through said pockets and directly upward into said conduit.

3. In an eliminator, the combination of a conduit for a flowing gas, a plurality of members within said conduit forming pockets adapted to entrap the foreign matter contained in said gas and discharge it downwardly, said members also forming sinuous passageways for said gas around said pockets and through the eliminator, and means below said conduit for receiving the foreign matter discharged from said pockets and communicating directly with said conduit immediately beyond and adjacent said pockets for permitting a circulation of a portion of said gas through said pockets and said last means and directly upward into said conduit.

4. In an eliminator, the combination of a conduit for a flowing gas, a plurality of parallel partitions vertically arranged within said conduit, members mounted on said partitions forming pockets adapted to entrap foreign matter, said pockets being closed at their upper ends and open at their lower ends to permit the foreign matter to be discharged downwardly and out of said pockets, and means at the discharge ends of said pockets having an outlet communicating directly with said conduit immediately beyond and adjacent said pockets for permitting circulation of a portion of said flowing gas through said pockets.

5. In an eliminator, the combination of a conduit for a flowing gas, a plurality of parallel partitions within said conduit, members secured to said partitions forming a plurality of pockets and sinuous passageways through said conduit, said pockets being adapted to entrap foreign matter and discharge it downwardly, and means below said conduit for collecting the foreign matter discharged downwardly from said pockets, said means having inlets at the discharge ends of said pockets and a single outlet communicating directly with said conduit immediately beyond and adjacent said pockets.

6. In an eliminator, the combination of a conduit for a flowing gas, a plurality of parallel partitions arranged vertically within said conduit, and semi-tubular members secured in pairs one on each side of said partitions, the pairs being located in staggered relation on the several partitions to form sinuous passageways between said partitions for the passage of the gas therethrough, said semi-tubular members being secured at their rear edges to said partitions and out of contact with said partition, said semi-tubular members having inwardly projecting lips at their front edges and forming protected areas in which foreign matter is entrapped and discharged out of said conduit.

7. In an eliminator, the combination of a conduit for a flowing gas, a plurality of parallel partitions, vertically arranged within said conduit, trough-shaped members arranged at the trailing ends of alternate partitions for collecting foreign matter and discharging it downwardly, and semi-tubular curved members secured on opposite sides of said partitions and arranged in staggered relation to each other to form sinuous passageways between said partitions for the passage of gases therethrough, said semi-tubular members having inwardly projecting lips and forming protected areas in which foreign matter is entrapped and discharged out of said conduit.

8. In an eliminator, the combination of a conduit for a flowing gas, members in said conduit forming pockets adapted to entrap foreign matter and discharge it out of said conduit, and a hopper having an inlet adjacent the discharge ends of said pockets, said hopper having an outlet communicating directly with said conduit immediately beyond and adjacent the discharge ends of said pockets.

9. In an eliminator, the combination of a conduit for a flowing gas, a plurality of partitions vertically arranged within said conduit, pockets on said partitions adapted to entrap foreign matter, said pockets being closed at the top and open at the bottom to cause the foreign matter caught thereby to be discharged downwardly and out of said pockets, and an elongated hopper for receiving the foreign matter discharged by said pockets having an outlet substantially midway between its ends communicating directly with said conduit immediately beyond and adjacent said pockets for permitting a circulation of a portion of said gas through said pockets and said hopper.

10. In an eliminator, the combination of a conduit for a flowing gas, a plurality of parallel partitions vertically arranged within said conduit, members on said partitions forming pockets adapted to entrap foreign matter, said pockets being open at the bottom to permit the foreign matter entrapped thereby to be discharged downwardly and out of said pockets, and a means at the discharge ends of said pockets for receiving said foreign matter and having an outlet communicating directly with said conduit immediately beyond and adjacent said pockets for permitting a circulation of a portion of said gas through said pockets, the area of said outlet being greater than the total discharge area of said pockets.

11. In an eliminator, the combination of a conduit for a flowing gas, members in said conduit forming pockets adapted to entrap foreign matter and discharge it downwardly, and a hopper having an inlet at the discharge end of each of said pockets and an outlet communicating directly with said conduit immediately beyond and adjacent the said pockets, the relative areas of said outlet and said inlets being so proportioned that the velocity of the gases entering said hopper will be reduced sufficiently to permit the foreign matter to settle before the gases entering said hopper return to said conduit.

In witness whereof, I have hereunto set my hand this 17th day of May 1924.

ARTHUR R. SMITH.